United States Patent
Niska et al.

(10) Patent No.: US 7,733,881 B2
(45) Date of Patent: Jun. 8, 2010

(54) AUTOMATIC ADAPTATION OF QUALITY OF SERVICE OVER PACKET-SWITCHED NETWORKS

(75) Inventors: Håkan Niska, Linköping (SE); Jari Vikberg, Järna (SE); Tomas Nylander, Värmdö (SE); Magnus Hallenstal, Täby (SE); Lars Peter Öhman, Enebyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 350 days.

(21) Appl. No.: 11/597,632

(22) PCT Filed: May 25, 2004

(86) PCT No.: PCT/EP2004/005609

§ 371 (c)(1),
(2), (4) Date: Nov. 19, 2007

(87) PCT Pub. No.: WO2005/117362

PCT Pub. Date: Dec. 8, 2005

(65) Prior Publication Data

US 2008/0212593 A1 Sep. 4, 2008

(51) Int. Cl.
*H04L 12/28* (2006.01)
(52) U.S. Cl. .................... 370/400; 370/468
(58) Field of Classification Search .......... None
See application file for complete search history.

(56) References Cited

U.S. PATENT DOCUMENTS 7,289,453 B2 * 10/2007 Riedel et al. ............ 370/252

FOREIGN PATENT DOCUMENTS

WO 02/098077 A1 12/2002
WO 03/041344 A1 5/2003

OTHER PUBLICATIONS

International Search Report for PCT/EP2004/005609 mailed Dec. 14, 2004.

* cited by examiner

*Primary Examiner*—Steven H Nguyen
(74) *Attorney, Agent, or Firm*—Nixon & Vanderhye P.C.

(57) ABSTRACT

An end node in a packet-switched network is proposed wherein the end node is arranged to exchange packets consisting of a packet header and payload data with a server node connected to the packet-switched network. The end node includes at least one module adapted to extract quality of service parameter values from the headers of packets received over the packet-switched network and to insert the extracted quality of service parameter value in the headers of packets destined for transmission to the server node over the packet-switched network. In this manner the end node automatically adapts the quality of service parameters received over the packet-switched network to correspond with the type of quality of service defined in received packets. Such a system means that only the server node need be configured with the quality of service parameters applicable on the particular packet switched network, so greatly reducing the installation and configuration overheads in a multi-user network.

10 Claims, 5 Drawing Sheets

AUTOMATIC ADAPTATION OF QUALITY OF SERVICE OVER PACKET-SWITCHED NETWORKS

This application is the US national phase of international application PCT/EP2004/005609 filed 25 May 2004, the entire contents of which is hereby incorporated by reference.

FIELD

The invention relates to the transmission of delay-sensitive and quality-sensitive services such as voice or media applications over an Internet Protocol (IP-based) network, in particular, as part of a mobile communications system.

BACKGROUND

When an IP-based network is utilised for the transmission of certain quality-sensitive services, such as voice or video data, there is a need to prioritise this kind of traffic. Previously, IP networks could offer only a "best effort" quality of service, wherein no differentiation was made between traffic types within a network element and packets were routinely dropped in the event of congestion. More recently IP networks are offering some quality of service guarantees. One example is the differentiated service, which provides a so-called "soft Quality of Service" mechanism that adds some information to an IP packet header so that intermediate nodes in the network, such as routers, can handle these packets differently. However, the settings of these parameters are not standardised. Consequently the values used to indicate specific levels of quality of service differ from IP network to IP network.

In present-day systems the quality of service parameters are conventionally set at network end points, although these parameters can be changed at intermediate nodes if these are configured to do so. The problem with implementing such a solution is that all clients using the network need to know which quality of service settings apply in any particular network. This is particularly problematic in systems where mobile communication services incorporate an IP network, for example, in an unlicensed radio access network, as all mobile stations that may at some time connect to the network must know the applicable settings. A similar problem arises when several data services with different quality of service needs are offered. The configuration of all the clients becomes very burdensome. While manual configuration by each client is possible, this presupposes a certain skill and knowledge and is consequently error-prone and ultimately unreliable. Configuration of a mobile station could be achieved by the transmission of an SMS, however, this also requires some action by the end user, such as accepting the SMS and some system must be provided for dispatching the SMSs to the appropriate mobile stations.

SUMMARY OF THE INVENTION

It is thus an object to provide an acceptable quality of service appropriate for the data transmitted whilst minimising the configuration overheads.

This an other objects are achieved in accordance with a node, mobile station, unlicensed radio access point and method as defined in the appended claims.

An end node in a packet-switched network exchanges packets consisting of a packet header and payload data with a server node connected to the packet-switched network. The end node includes at least one module adapted to extract quality of service parameter values from the headers of packets received over the packet-switched network and to insert the extracted quality of service parameter value in the headers of packets destined for transmission to the server node over the packet-switched network. In this manner the end node automatically adapts the quality of service parameters received over the packet-switched network to correspond with the type of quality of service defined in received packets. The server node need only be configured with the quality of service parameters applicable on the particular packet switched network, thereby greatly reducing the installation and configuration overheads in a multi-user network.

In accordance with a preferred example embodiment the module is further adapted to store a last extracted quality of service parameter value and to update this stored quality of service parameter value if a subsequently received parameter value differs from the stored value. This greatly reduces the processing required prior to transmitting each packet, as the quality of service parameter value can be set by default to the stored value unless this value is updated.

The technology described herein is particularly advantageous when the end node is a mobile station and the packet-switched network is part of an access network to a mobile communications network, as the number of mobile stations connected to the packet switched network will constantly be changing. Enabling an appropriate quality of service without prior configuration of the mobile stations greatly simplifies the installation of such access networks.

DETAILED DESCRIPTION OF THE DRAWINGS

The technology will be described with specific reference to a mobile communications system having access networks that incorporate a broadband IP network. In the exemplary embodiment, the access network is an unlicensed radio access network, however, it will be understood that the principals apply equally to any server-based network having a plurality of end users or clients connected to a single aggregate node, such as a telephony server via an IP network, IP Multimedia System (IMS) or the like.

Figure 1:
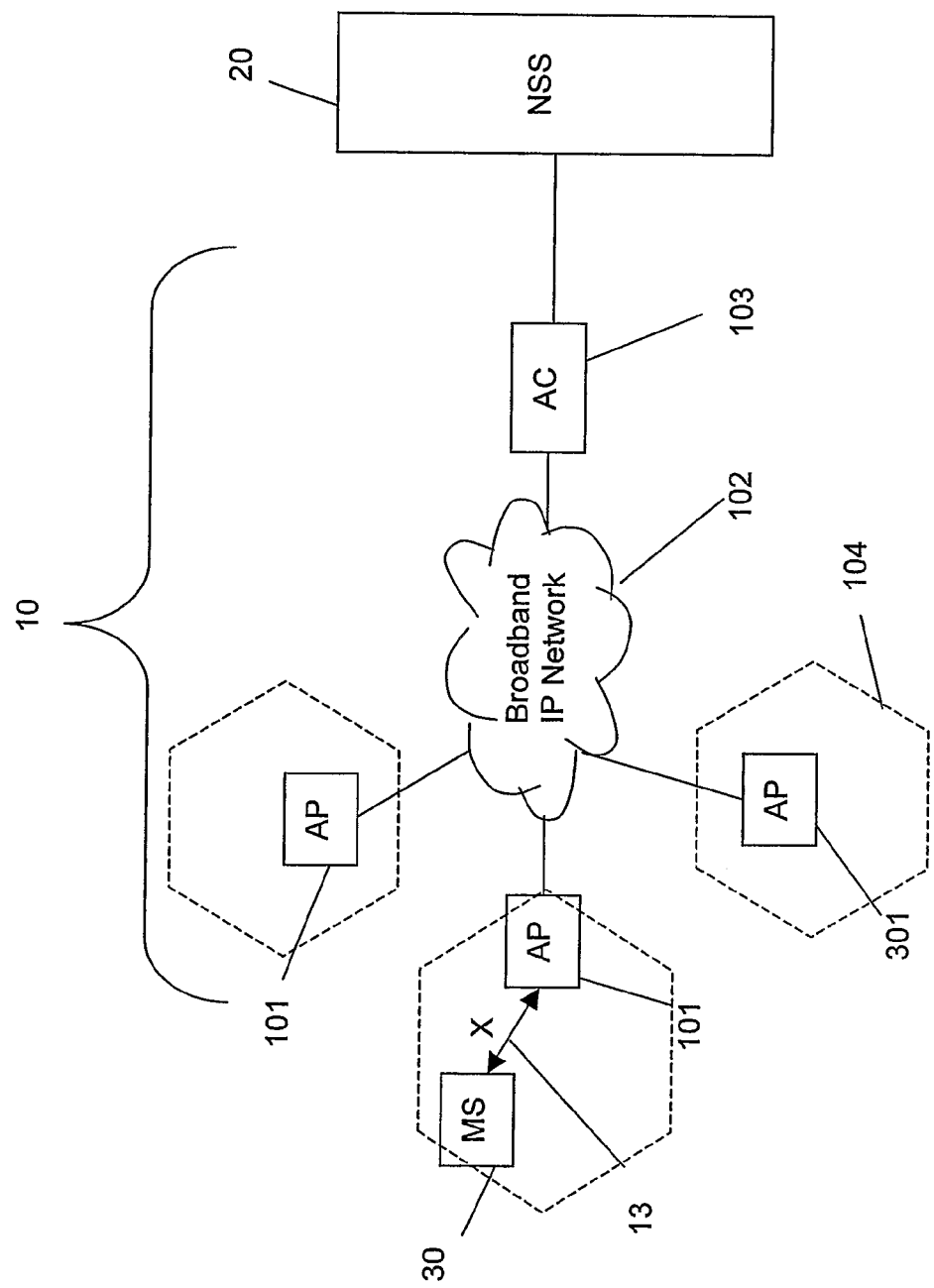
FIG. 1 schematically depicts an unlicensed radio access network of a mobile communication system.

FIG. 1 shows an unlicensed-radio access network that enables mobile stations to communicate with the core network portion of a conventional mobile communications network, such as a GSM network, and through this other communication networks, via an unlicensed-radio interface. The access network 10 comprises an access controller AC 103, which communicates with the core network portion of a conventional cellular mobile communications network NSS 20 over standard interfaces, such as the A- or Gb-interface for a GSM cellular network. It is assumed that the services accessed via this unlicensed radio access network 10 include mobile services, including SMS and packet services, such as the General Packet Radio Service GPRS. To this end, the access controller AC 103 will interface with both mobile services switching centers MSC and GPRS support nodes SGSN in the core network portion 20.

The access controller AC 103 is connected to a plurality of access points AP 101 via a broadband IP-based packet-switched network 102. The packet-switched network 102 may be a dedicated private network or part of an already existing network, preferably with access to the Internet, that is connected to various other devices, nodes and possibly also to other private and public networks. The access points AC 101 are adapted to communicate across an unlicensed-radio interface X denoted by the double headed arrow 13 in FIG. 1, with mobile stations MS 30 and to this end comprise radio transceivers that define a coverage area or cell 104 illustrated by a dashed line in FIG. 1 in a similar manner to the operation of a conventional GSM base station transceiver.

By unlicensed-radio is meant any radio protocol that does not require the mobile network operator to have obtained a license from the appropriate regulatory body. In general, such unlicensed-radio technologies must be low power and thus of limited range compared to licensed mobile radio services. The radio interface may utilise any suitable unlicensed-radio protocol, for example a wireless LAN protocol or Digital Enhanced Cordless Telecommunications (DECT). Preferably, however, Bluetooth radio is utilised, which has a high bandwidth and lower power consumption than conventional public mobile network radio.

The access points AP 101 may be dedicated entities in the access network 10 that are registered with the access controller AC 103 and are capable of establishing a connection with a mobile station 30 independently of a connection with the access controller AC 103. Alternatively, the access points AP 101 may be essentially transparent to both mobile stations 30 and the access controller AC 103. In this latter case, a mobile station 30 will establish a connection directly with the access controller AC 103 across the broadband packet-switched network 102 and vice versa.

The broadband packet-switched network 102 carries data between the various nodes, i.e. the multiple access points 101 or the mobile stations 30 and the access controller 103 using the Internet Protocol IP. The link over the broadband network 102 is always open, so that this connection is always available without the need for reserving a channel. Specifically, a transport protocol is utilised that maintains a connection state between a mobile station MS 1 and the access controller AC 303. Suitable transport protocols include the Transmission Control Protocol (TCP), the User Datagram Protocol (UDP) or the Stream Control Transfer Protocol (SCTP). Voice data is typically carried over the network 102 using Real-Time Protocol RTP over User Datagram Protocol UDP over IP.

Communication across the broadband network 102 is thus carried out in the conventional many-to-one node structure with the access controller AC 103 acting as a server node. The multiple end points are provided either by the access points AP 101, when these are dedicated access points or the mobile stations 30 connected to the access points, when the access points are essentially transparent. A simplified representation of the signalling planes of the mobile station 30, access point 101 and access controller 103 for these two embodiments are depicted in FIGS. 2 and 3.

Figure 2:
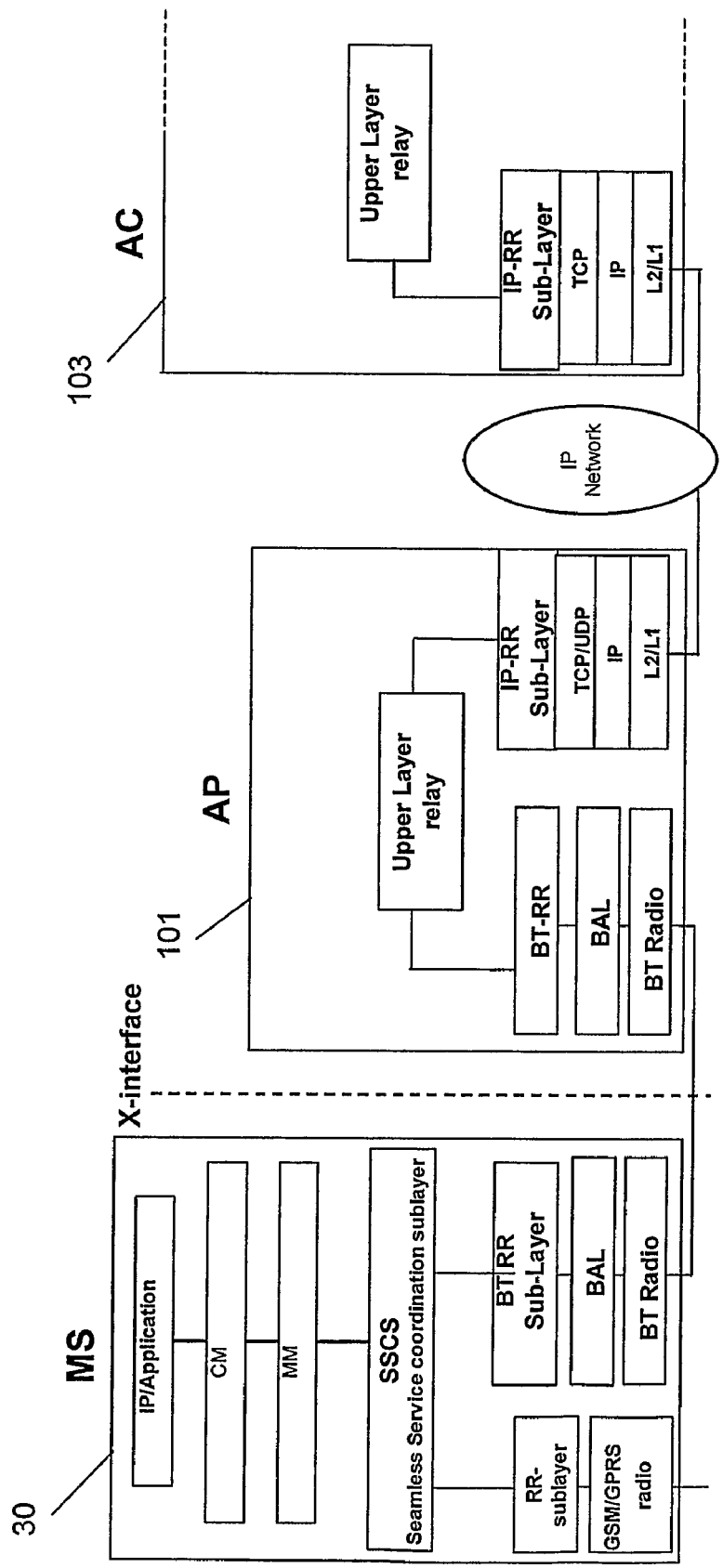
FIG. 2 shows a simplified signalling plane for the link between a mobile station, a dedicated access point and an access controller according to a first embodiment of the unlicensed radio access network of FIG. 1.
Figure 3:
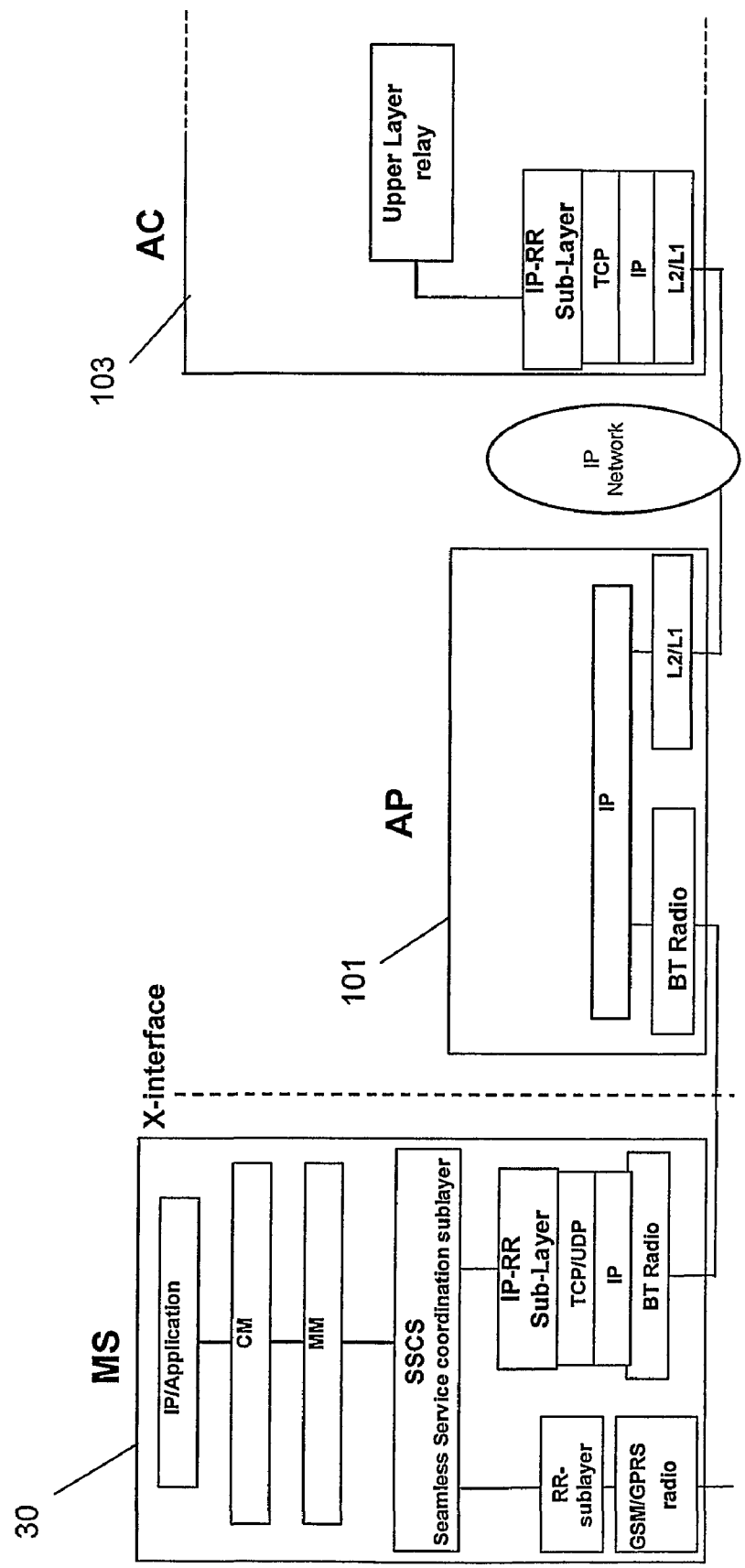
FIG. 3 shows a simplified signalling plane for the link between a mobile station, a transparent access point and an access controller according to a second embodiment of the unlicensed radio access network of FIG. 1.

Turning first to FIG. 2, there is shown the signalling plane for communication between a mobile station MS 30 and access controller AC 103 via a dedicated access point AP 101.

The mobile station MS has two parallel protocol stacks, one for handling communication over the conventional GSM radio interface and the other for handling communication over the unlicensed radio or X-interface with an access point AP. At the GSM side the mobile station has a GSM/GPRS radio layer below a radio resource RR-sublayer. This protocol stack is replaced with a stack consisting of an unlicensed radio layer, which in the present example is a Bluetooth radio layer BT Radio, a Bluetooth adaptation layer, BAL, and above this a Bluetooth radio resource sub-Layer. Over both parallel stacks is a service coordination sublayer SSCS, which leads into the upper layers such as the mobility management layer, MM, connection management layer CM and IP/Application layer.

The dedicated access point AP has layers replicating the unlicensed radio layers in the mobile station MS at its X-interface. The upper layer protocols are relayed through the access point AP. At the interface across the IP network 102 the stack includes in descending order of an IP radio resource sub-layer, IP-RR, a layer for handling Transmission Control Protocol and User Datagram Protocol, TCP/UDP, an Internet Protocol layer IP. OSI Layer 1 and 2 protocols are below the IP protocol layer. In the access controller AC only the IP network interface layers are depicted. These layers mirror those provided in the access point AP. Upper layer protocols are relayed in the access controller. The interface with the core network is a conventional A or Gb interface well known to those skilled in the art and will not be elaborated on further here.

In the embodiment illustrated in FIG. 3 with a so-called "transparent" access point AP, the protocol stack of the access controller AC is unchanged compared to FIG. 2. However, the protocol stack in the mobile station MS supporting the unlicensed radio or X-interface and all protocol stacks in the access point AP are modified over the embodiment shown in FIG. 2. Specifically, the GSM interface and common layers of the mobile station MS are unchanged over the embodiment of FIG. 2, however, the unlicensed radio or Bluetooth radio resource and Bluetooth Adaptation layer have been replaced by, in descending order, an Internet Protocol radio resource sub-layer IP-RR, a TCP/UDP layer and an Internet Protocol Layer IP. These three layers are provided over the Bluetooth radio layer. In the transparent access point AP, only a Bluetooth radio layer and an IP relay layer are provided at the X-interface. The IP relay layer is also over OSI Layer 1 and 2 protocols provided on the interface with the IP network. All other layers are relayed over the access point AP. Since none of the signalling from the mobile station MS or the access controller AC terminate in the access point, the access point is essentially transparent to these nodes.

Figure 4:
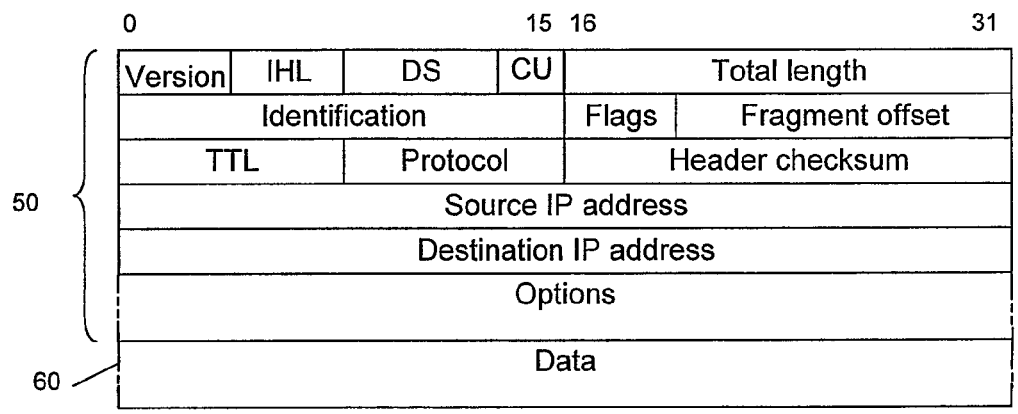
FIG. 4 shows the structure of an IP packet, FIG. 5 schematically depicts a part of a mobile station.

FIG. 4 illustrates the structure of an IP packet. As shown in this figure, the IP packet consists of a header 50 and payload data 60. The header normally consists of 20 bytes of data. Further optional bytes can be added. The fields of the header 50 starting from the least significant byte, are as follows: 4-bit protocol version; 4-bit IP header length, IHL; 6-bit Differentiated Services field (DS) that defines a Differentiated services Code Point (DSCP), followed by two unused bits (currently unused CU) which together was previously an 8-bit Type of Service field, TOS; 16-bit datagram size in bytes; 16-bit packet identification; 4-bit flags used to control whether routers are allowed to fragment a packet; 12-bit fragmentation offset; 8-bit time to live, TTL, indicating the number of hops or links the packet may be routed over; 8-bit protocol, indicating the type of packet being carried; 16-bit header checksum; 32-bit source IP address; 32-bit destination IP address; options (if any). The Differentiated Services field (DS) (previously part of the Type of Service TOS) is provided to indicate the Quality of Service needs from the network. The different types of service are indicated by a different value, called a differentiated services code point DSCP, in this field. The values used in this field for any particular IP network is not standardised. Consequently, if an end node using a particular network is to use the Quality of Service mechanisms to the full, it must be configured with the particular Quality of Service parameters that are applicable in the network.

For those networks that have a large number of clients, such as the dedicated access points AP 101 illustrated in FIGS. 1 and 2 or the mobile stations MS 30 illustrated in FIGS. 1 and 3, configuration of all end points becomes very burdensome and particularly for mobile stations, highly unreliable, as the subscriber must participate in the configuration, which will inevitably lead to errors. In accordance with the technology described herein, the need to configure the end nodes is precluded, as the end node instead adapts automatically to the Quality of Service parameters received.

Figure 5:
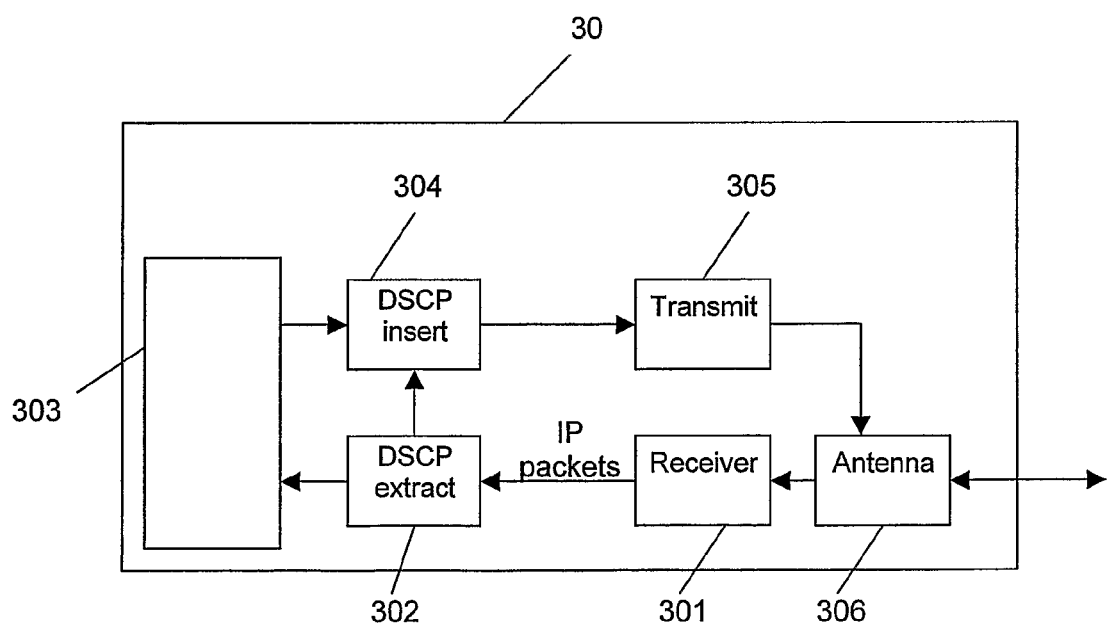

Turning now to FIG. 5 there is illustrated a portion of a mobile station 30 adapted to handle IP packets received and transmitted over the X interface with the broadband network 102. This mobile station 30 is equivalent to the type illustrated in FIG. 3 that operates together with transparent access points. The illustrated portion includes an antenna 306 used for receiving and transmitting data over the unlicensed radio interface X. Received data is received by a receiver module 301 that extracts the IP packets and passes these to a DSCP extract module 302. This DSCP extract module 302 extracts the DSCP value from the DS field in the IP packet header. The data is then passed on to processing circuitry 303 for processing of the remaining header information and the payload data in the conventional manner. The function and structure of such processing circuitry is well known in the art and will not be described in further detail here. The DSCP extract module 302 also passes the extracted DSCP value and the Source IP address to a DSCP insert module coupled to the processing circuitry 303. Data to be transmitted via the X-interface is sent by the processing circuitry 303 to a transmitter 305 via the DSCP insert module 304. This module inserts the DSCP value received from the DSCP extract module 302 into the DS header field of outgoing IP packets directed to a Destination IP address that is equal to the Source IP address indicated extracted by the DSCP extract module 302. The IP packet is then sent to a transmit module 305 and from there to the antenna 306 to be transmitted over the Bluetooth or other unlicensed radio interface. The DSCP value inserted into outgoing IP packets will always reflect the value contained in the last received IP packet for a given Source-Destination pair. In this way it is ensured that the Quality of Service set by the access controller AC 103 will also be set by the mobile station. In order to limit the processing required to insert a current DSCP value, either the DSCP extract module 302 or the DSCP insert module 304 has a register or memory for storing the last set DSCP value. When an IP packet is received over the X-interface the extracted DSCP value is then simply compared with the stored value. Only if these two values differ is the newly received value stored and used for all future outgoing IP packets. An example of traffic that may require different Quality of Service parameters are the signalling for setting up a control channel between the mobile station MS 30 and access controller AC 103, voice packets and IP packets related to the different traffic used in data services such as GPRS. The first mobile station-initiated signalling with an access controller AC 103 will not have a stored DSCP. However, the last stored DSCP value is preferably used for all subsequent mobile station-initiated signalling with the same access controller AC 103.

The structure illustrated in FIG. 5 is given only by way of example. It will be understood that the DSCP extraction, insertion and storage may be performed by a single module and even combined with other processing of the received and transmitted IP packets, for example using microprocessor circuitry.

It will be appreciated that analogous DSCP extract and DSCP insert modules or their equivalent functions will be present in the dedicated access points illustrated in FIG. 2, as these elements then serve as the end nodes in the IP network. Indeed these modules may be provided in any end nodes communicating with a server node across an IP network to avoid the need for configuring Quality of Service parameters prior to their operation.

Figure 6:
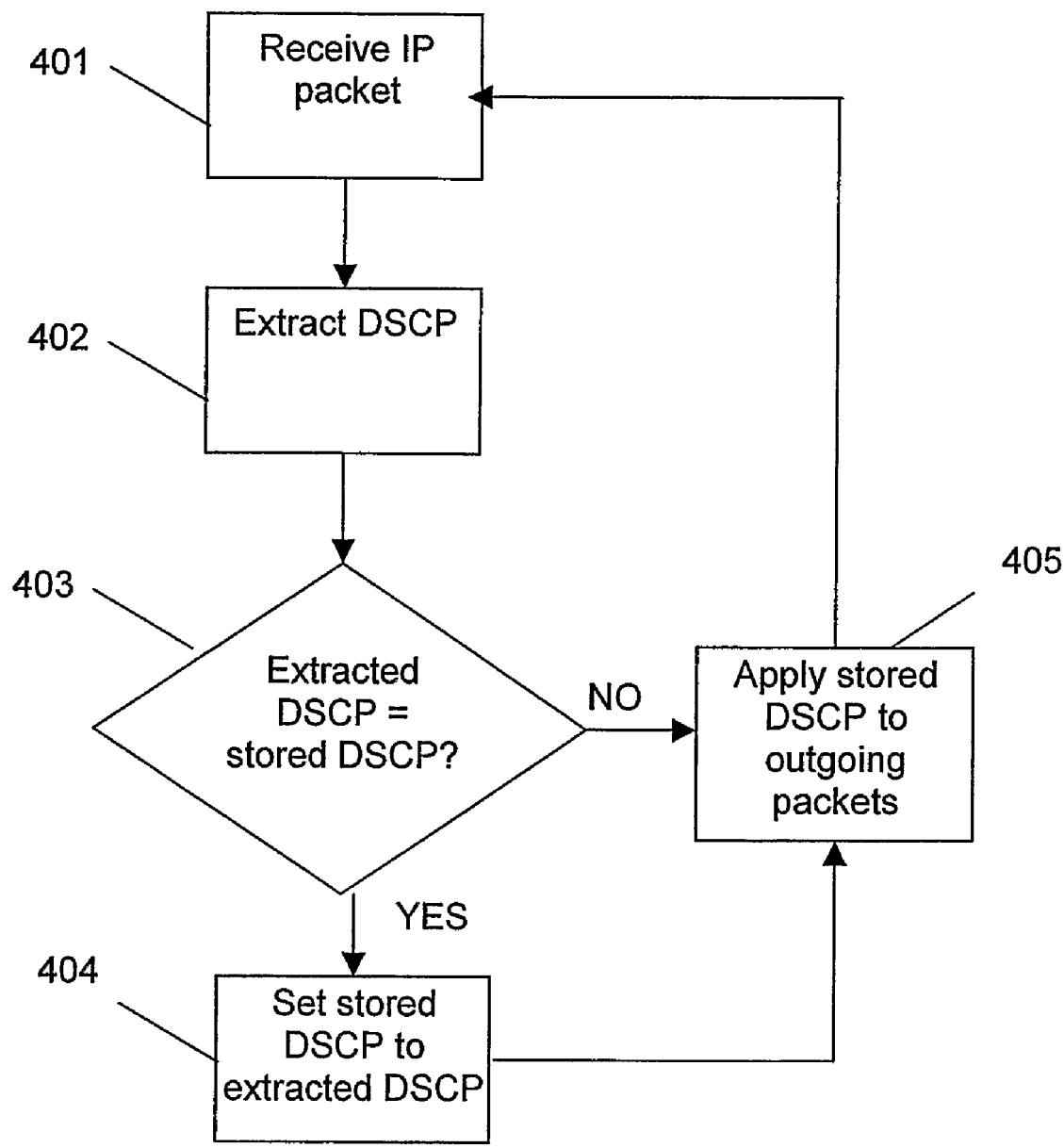
FIG. 6 is a flow diagram illustrating a method of adaptation of a mobile station or dedicated access point to quality of service parameters.

The automatic Quality of Service adaptation function performed by the combined DSCP extract and insert modules 302 and 304 in both a mobile station MS 30 used with a transparent access point AP 101 and in a dedicated access point 101 is illustrated schematically in the flow diagram in FIG. 6. In both cases, communication is conducted with the access controller AC 103, which essentially acts as a server to these nodes in the network 102. It should be noted that the access controller AC 103 is configured with the relevant Quality of Service settings applicable for the particular broadband IP network 102 used. However, only this node requires configuration prior to operation.

The flow diagram of FIG. 6 starts with step 401 when an IP packet is received over the IP network 102 and possibly also over the X-interface. At step 402, the DSCP value is extracted from the IP header. This DSCP value is compared with a stored DSCP value at step 403. If these two values differ from one another the method moves on to step 404, where the stored DSCP value is set at the value of the received DSCP. This will apply equally when a previous DSCP value has been stored to update the DSCP value and also when no DSCP value is stored. If the comparison at step 403 reveals that the received DSCP value is the same as the previously stored value, the method moves to step 401 and the stored DSCP value is inserted in the headers of outgoing IP packets.

The adaptation of an end node to received quality of service parameters has been described with specific reference to a an unlicensed radio access network for mobile communications incorporating an ip network 102. However this technology is applicable to other types of packet-switched networks and packet or datagram quality of service parameters. For example, the network 102 could carry ip as layer 3 over an ethernet layer 2 in which case the quality of service parameters defined in ethernet may be used instead of the dscp field in the ip packet. The technology described herein is also not limited to unlicensed radio access networks but is equally applicable to a similar multi end node to server node structure on a packet-switched network.

The invention claimed is:

1. An end node in a packet-switched network, the end node being arranged to exchange packets including a packet header and payload data with a server node connected to the packet-switched network, wherein the end node includes at least one module configured to extract quality of service parameter values from the headers of packets received over the packet-switched network and to insert the extracted quality of service parameter values in the headers of packets for transmitting to the server node over the packet-switched network.

2. An end node as claimed in claim 1, wherein the module is further configured to store a last extracted quality of service parameter value and to update the stored quality of service parameter value if a subsequently received parameter value differs from the stored value.

3. An end node as claimed in claim 1, wherein the end node is a mobile station connected to the packet-switched network via an unlicensed radio interface and to communicate with a mobile communication core network through the server node.

4. An end node as claimed in claim 1, wherein the end node is an access point of an unlicensed radio access network, the access point being configured to communicate with mobile stations over an unlicensed radio interface.

5. A node as claimed in claim 1, wherein the packet-switched network is an IP network and the data packets are IP packets consisting of an IP packet header and payload data.

6. A node as claimed in claim 5, wherein the module is further configured to identify an IP source address in the header of packets from which a quality of service parameter value is extracted and wherein the module is further configured to insert the extracted quality of service parameter value into the headers of packets having an IP destination address that is equivalent to the IP source address.

7. A method of automatically adjusting quality of service parameters contained in the headers of data packets transmitted over a packet-switched network the method comprising:

an end node of the packet-switched network extracting quality of service parameter values from the headers of data packets received from a server node over the packet-switched network, and inserting the extracted quality of service parameter values into the headers of data packets to be transmitted from the end node to the server node over the packet-switched network.

8. A method as claimed in claim 7, further comprising:

the end node storing the last extracted quality of service parameter value, and inserting the stored quality of service parameter value into the headers of data packets to be transmitted to the server node over the packet-switched network.

9. A method as claimed in claim 8, further comprising:

the end node comparing an extracted quality of service parameter value with the stored parameter value and replacing the stored quality of service parameter value with the extracted quality of service parameter value if these values differ from one another.

10. A method as claimed in claim 8, wherein the data packets are IP packets consisting of an IP packet header and payload data.

* * * * *

UNITED STATES PATENT AND TRADEMARK OFFICE
CERTIFICATE OF CORRECTION

Page 1 of 1

PATENT NO. : 7,733,881 B2
APPLICATION NO. : 11/597632
DATED : June 8, 2010
INVENTOR(S) : Niska et al.

It is certified that error appears in the above-identified patent and that said Letters Patent is hereby corrected as shown below:

In Column 1, Line 61, delete "an" and insert -- and --, therefor.

In Column 3, Line 14, delete "AC" and insert -- AP --, therefor.

In Column 3, Line 50, delete "303." and insert -- 103. --, therefor.

In Column 6, Line 44, after "to" delete "a".

In Column 6, Line 46, delete "ip" and insert -- IP --, therefor.

In Column 6, Line 49, delete "ip" and insert -- IP --, therefor.

In Column 6, Line 50, delete "ethernet layer" and insert -- Ethernet layer --, therefor.

In Column 6, Line 51, delete "ethernet may" and insert -- Ethernet may --, therefor.

In Column 6, Line 51, delete "dscp" and insert -- DSCP --, therefor.

In Column 6, Line 52, delete "ip" and insert -- IP --, therefor.

In Column 7, Line 12, in Claim 5, delete "A node as" and insert -- An end node --, therefor.

In Column 7, Line 15, in Claim 6, delete "A node" and insert -- An end node --, therefor.

Signed and Sealed this
First Day of March, 2011

David J. Kappos
*Director of the United States Patent and Trademark Office*